US010919769B2

(12) United States Patent
Müller-Hellwig et al.

(10) Patent No.: US 10,919,769 B2
(45) Date of Patent: Feb. 16, 2021

(54) UTILIZATION OF POLLUTANTS FROM INTERNAL COMBUSTION ENGINES

(71) Applicant: AUDI AG, Ingolstadt (DE)

(72) Inventors: Simone Müller-Hellwig, Ingolstadt (DE); Hagen Seifert, Regensburg (DE); Roland Heigl, Eitensheim (DE); Alexander Krajete, Pasching (AT); Arne Seifert, Vienna (AT)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/637,618

(22) PCT Filed: Dec. 3, 2018

(86) PCT No.: PCT/EP2018/083337
§ 371 (c)(1),
(2) Date: Feb. 7, 2020

(87) PCT Pub. No.: WO2019/141425
PCT Pub. Date: Jul. 25, 2019

(65) Prior Publication Data
US 2020/0198970 A1 Jun. 25, 2020

(30) Foreign Application Priority Data
Jan. 18, 2018 (DE) ............ 10 2018 000 378.8

(51) Int. Cl.
*B01D 53/04* (2006.01)
*C01B 21/48* (2006.01)
(Continued)

(52) U.S. Cl.
CPC ............. *C01B 21/48* (2013.01); *B01D 53/04* (2013.01); *C01B 21/40* (2013.01); *F01N 3/0842* (2013.01);
(Continued)

(58) Field of Classification Search
None
See application file for complete search history.

(56) References Cited

U.S. PATENT DOCUMENTS

2016/0222852 A1* 8/2016 Ren .................. F01N 3/0871
2016/0312675 A1 10/2016 Liu et al.

FOREIGN PATENT DOCUMENTS

DE         100 49 119 A1    4/2002
DE   11 2006 001 296 T5    4/2008
(Continued)

OTHER PUBLICATIONS

Kanazawa et al. JPH09249472A—translated document (Year: 1997).*
(Continued)

*Primary Examiner* — Jelitza M Perez
(74) *Attorney, Agent, or Firm* — Staas & Halsey LLP

(57) ABSTRACT

Nitrogen oxides formed in combustion engines are recycled such that the nitrogen oxides can be utilized for producing liquid or solid chemicals. The nitrogen oxides are recycled by a method including an adsorber material adsorbing nitrogen oxides from an exhaust-gas stream of the combustion engine, removing the adsorber material laden with nitrogen oxides, desorbing the adsorbed nitrogen oxides from the adsorber material, and converting the nitrogen oxides desorbed from the adsorber material into liquid or solid nitrogen-containing compounds.

19 Claims, 1 Drawing Sheet

(51) Int. Cl.
 *C01B 21/40* (2006.01)
 *F01N 3/08* (2006.01)
(52) U.S. Cl.
 CPC ...... *F01N 3/0885* (2013.01); *B01D 2253/108* (2013.01)

(56) References Cited

FOREIGN PATENT DOCUMENTS

| | | |
|---|---|---|
| DE | 10 2012 208 072 A1 | 11/2012 |
| DE | 10 2018 000 378.8 | 1/2018 |
| EP | 1 625 884 A1 | 2/2006 |
| EP | 2 476 473 A1 | 7/2012 |
| JP | 9-249472 | 9/1997 |
| JP | 09249472 A * 9/1997 | ............... C05C 1/00 |
| WO | PCT/EP2018/083337 | 12/2018 |

OTHER PUBLICATIONS

International Search Report dated Jan. 31, 2019 from International Application No. PCT/EP2018/083337, 4 pages.
Translation of International Preliminary Report on Patentability dated Sep. 12, 2019, from International Application No. PCT/EP2018/083337, 8 pages.

\* cited by examiner

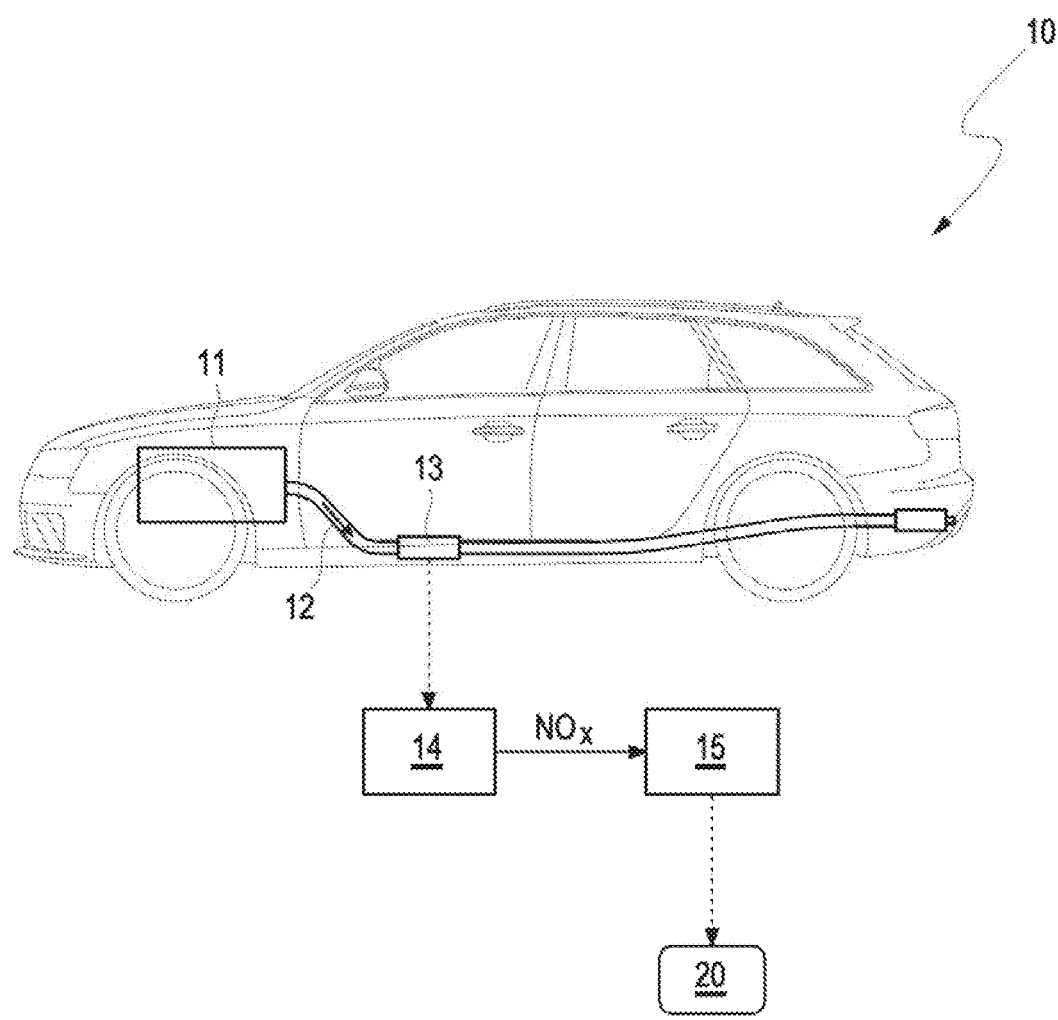

UTILIZATION OF POLLUTANTS FROM INTERNAL COMBUSTION ENGINES

CROSS REFERENCE TO RELATED APPLICATIONS

This application is a U.S. national stage of International Application No. PCT/EP2018/083337 filed on Dec. 3, 2018. The International Application claims the priority benefit of German Application No. 10 2018 000 378.8 filed on Jan. 18, 2018. Both the International Application and the German Application are incorporated by reference herein in their entirety.

BACKGROUND

The disclosure relates to the recycling of nitrogen oxides formed in combustion engines. A system and a method are described with which the nitrogen oxides can be utilized for producing liquid or solid chemicals.

Combustion engines burn fuel with a feed of air to form exhaust gases. Exhaust-gas standards define the upper limits for the emissions of pollutants (for example $NO_x$). The limit values are becoming ever more stringent. To reduce pollutant emissions, various efficiency measures and lightweight construction are presently used, which are intended to minimize the generation of the pollutants. Furthermore, the emission of pollutants is reduced through efficient exhaust-gas after-treatment (post-treatment).

One measure for reducing pollutant emissions is adsorptive exhaust-gas after-treatment, which can for example remove $NO_x$ from the exhaust-gas stream. Here, the exhaust gas is conducted through a unit with adsorption material. In the best case, 100% of the emissions are retained and accumulate on the material. When the adsorption capacity of the filter material has been exhausted, the filter material is exchanged or regenerated.

For example, German Patent Application No. 10 2012 208 072 A1 has described a device for purifying vehicle exhaust gases having a particle filter element. The filter element is exchangeable and is exchanged in the presence of a sufficient loading.

German Patent Application No. 11 2006 001 296 T5 has described an exhaust line for combustion engines. The exhaust line includes a filter device, which collects nitrogen oxides in a nitrogen oxide trap. When the capacity limit of the nitrogen oxide trap has been reached, the nitrogen oxide trap is regenerated. For this purpose, the engine is operated with a rich mixture, and the exhaust gas generated is converted, with nitrogen oxides from the nitrogen oxide trap, to form nitrogen and carbon dioxide.

European Patent Application No. 2 476 473 A1 relates to a filter module for the adsorption of particles present in the ambient air and/or for the conversion of gaseous airborne pollutants that form for example during the operation of motor vehicles on roads or rails or in other combustion processes. The filter module filters pollutants such as fine dust, nitrogen oxides or volatile hydrocarbons from the ambient air and catalytically converts these into less harmful compounds. The filter material used is exchangeable.

In the described method, either waste material is generated in the form of used filter material, or, during the regeneration of the filter material, the adsorbed pollutants are released again, or are converted in such a way as to form other gaseous pollutants.

SUMMARY

Against this background, described herein is a method and a system for reducing the emissions of nitrogen oxides formed in combustion engines, which avoid the described disadvantages.

A feature of the disclosure is that nitrogen oxides ($NO_x$) which are formed in combustion engines, and which have been removed from the exhaust gas by adsorption on an adsorber material of a $NO_x$ store and have accumulated in the $NO_x$ store, are, after removal of the laden $NO_x$ store, desorbed from the latter and fed to a conversion process. The conversion process utilizes nitrogen oxides desorbed from the adsorber material to produce liquid or solid nitrogen-containing compounds, for example fertilizers. The adsorber material can, after the desorption of the nitrogen oxides (regeneration of the adsorber material), be used again for the adsorption of nitrogen oxides.

The subject of the disclosure is a method for the recycling of nitrogen oxides formed in a combustion engine.

The method includes, as a first operation, the adsorption of nitrogen oxides ($NO_x$) from an exhaust-gas stream of the combustion engine in an adsorber unit. For this purpose, during the operation of the combustion engine, an exhaust-gas stream of the combustion engine is conducted through an adsorber unit. In the adsorber unit, nitrogen oxides ($NO_x$) contained in the exhaust-gas stream are adsorbed. The adsorber unit is thereby charged with $NO_x$. In one embodiment of the method, this operation is performed until the capacity limit of the adsorber unit for accommodating nitrogen oxides has been reached.

In one embodiment, the adsorber unit contains an adsorber material, which can bind nitrogen oxides, and the nitrogen oxides ($NO_x$) are adsorbed by the adsorber material arranged in the adsorber unit.

In one embodiment, the adsorber material includes at least one zeolite. Zeolites that can adsorb nitrogen oxides are known in principle to a person skilled in the art. Examples include ZSM-5, zeolite Y and mordenite.

In another embodiment, the adsorber material includes alkali oxides or alkaline earth oxides or alkali carbonates or alkaline earth carbonates. In an example embodiment, the adsorber material includes barium oxide, possibly in combination with platinum and rhodium.

After the end of the first operation of the method described herein, for example after the capacity limit of the adsorber unit has been reached, the adsorber unit laden with nitrogen oxides ($NO_x$) is removed from the exhaust-gas stream. The adsorbed nitrogen oxides ($NO_x$) bound in the adsorber unit are subsequently desorbed and fed to a conversion of the nitrogen oxides ($NO_x$) to form liquid or solid nitrogen-containing compounds.

In one embodiment of the method, the adsorber unit laden with nitrogen oxides ($NO_x$) is exchanged for an unladen adsorber unit. In another embodiment, an adsorber material laden with nitrogen oxides ($NO_x$) in the adsorber unit is exchanged for an unladen adsorber material. In a further embodiment, the adsorber material laden with $NO_x$ is collected and temporarily stored at a collecting point before the nitrogen oxides are desorbed from the adsorber material.

In one embodiment, the desorption of the nitrogen oxides from the adsorber unit is performed by heating of the adsorber unit or by virtue of hot water vapor, hot gas or a liquid solvent, for example water, being conducted through. In this way, the adsorbed $NO_x$ is converted into the vapor or liquid phase.

In one embodiment, the desorption of the nitrogen oxides from an adsorber material laden with $NO_x$ that has been removed from the adsorption unit is performed by treatment of the adsorber material with heat, hot vapor, hot gas or a liquid solvent (for example water). The $NO_x$ changes into the vapor or liquid phase, and the adsorber material remains unchanged. The adsorber material must possibly be dried before it can be used again for the removal of nitrogen oxides from exhaust gases. The temperature both during the desorption and during the drying is, for example, at most 200° C.

The $NO_x$ separated off from the adsorber unit is fed for further conversion. Here, the nitrogen oxides ($NO_x$) react to form liquid or solid nitrogen-containing compounds. For example, the $NO_x$ can be introduced into the production chain of nitric acid, nitrates or non-aqueous, $NO_2$— based solvents. In one embodiment, the liquid or solid nitrogen-containing compounds include nitrates, for example ammonium nitrate.

The method described herein offers a series of advantages, and can, for example, contribute to a reduction of the burden on the environment and energy consumption. Considering the overall process, atmospheric nitrogen is oxidized by the conversion in the combustion engine to form $NO_x$, which is temporarily stored in an adsorber unit and which, after desorption, is converted to form liquid or solid nitrogen-containing compounds.

The nitrogen oxides therefore do not pass into the atmosphere. Through the use of the method described herein, the nitrogen oxide emissions of vehicles with a combustion engine can be significantly reduced.

The reaction product formed can be fed for further use, for example as fertilizer. At the same time, $NO_2$ that would otherwise have to be produced for the production of the product is substituted. Through the substitution of $NO_2$ in the conversion reaction, energy is saved.

The nitrogen oxides contained in the exhaust gases of combustion engines are made industrially utilizable by use of the method described herein, because, after the desorption, they are available in concentrated form and are no longer diluted by the other exhaust-gas constituents. Since large quantities of nitrogen oxides are consumed in various industrial processes, it is possible for enormous quantities of the nitrogen oxides obtained from exhaust gases to be processed, that is to say the nitrogen cycle can, as it were, be made as large as desired.

Also described herein is a system for recycling nitrogen oxides formed in a combustion engine. The system includes an adsorber unit which is designed for the adsorption of nitrogen oxides from an exhaust-gas stream of the combustion engine, a desorption module which is designed for desorbing, from the adsorber unit, nitrogen oxides that have been adsorbed therein, and a reaction unit which is designed for liquefying the desorbed nitrogen oxides or converting them to form solid nitrogen-containing compounds. The system is, for example, suitable for carrying out the method described herein.

The system includes an adsorber unit which is designed for the adsorption of nitrogen oxides ($NO_x$) from an exhaust-gas stream of the combustion engine. In one embodiment, the adsorber unit is arranged in the exhaust tract of the combustion engine such that, during the operation of the combustion engine, an exhaust-gas stream is conducted through the adsorber unit.

In one embodiment, the adsorber unit contains an adsorber material which is designed to adsorptively bind nitrogen oxides ($NO_x$). In an example embodiment, the adsorber material includes at least one zeolite, for example ZSM-5, zeolite Y or mordenite. In another embodiment, the adsorber material includes alkali oxides or alkaline earth oxides or alkali carbonates or alkaline earth carbonates. In an example embodiment, the adsorber material includes barium oxide, possibly in combination with platinum and rhodium.

In one embodiment, the adsorber unit is designed as an exchangeable cartridge. This has the result that it can be removed from its position in the exhaust tract of the combustion engine, and exchanged for another similar cartridge, without great effort and in a non-destructive manner.

In a further embodiment, in which an adsorber material is arranged in the adsorber unit, the adsorber unit is designed such that its adsorber material laden with nitrogen oxides ($NO_x$) can be removed, and replaced with unladen adsorber material, in a non-destructive manner. For example, the adsorber unit may be designed as a reclosable container from which the adsorber material can be extracted or removed after opening of the container, for example by pivoting open, unscrewing or by opening of a lid or flap. After an unladen adsorber material has been inserted, the adsorber unit can be closed again and introduced into the exhaust-gas stream of the combustion engine.

The system described herein includes a desorption module which is designed for desorbing, from the adsorber unit, nitrogen oxides that have been adsorbed therein.

In one embodiment, the desorption module is designed for heating the adsorber unit, or feeding hot water vapor, hot gas or a liquid solvent thereto, and thereby desorbing nitrogen oxides from the adsorber unit.

In another embodiment, the desorption module is designed for heating adsorber material laden with nitrogen oxides, or treating the adsorber material with hot water vapor, hot gas or a liquid solvent, and thereby desorbing nitrogen oxides from the adsorber material.

The system described herein furthermore includes a reaction unit, which is configured for converting the desorbed nitrogen oxides from the desorption module into liquid or solid nitrogen-containing compounds. The reaction unit is designed for receiving a nitrogen-containing starting product stream from the desorption module and converting the nitrogen oxides with further reactants. In one embodiment, the reaction unit includes a reactor for the conversion of nitrogen oxides to form nitric acid. In a further embodiment, the reaction unit includes a reactor for the conversion of nitric acid with ammonia to form ammonium nitrate.

It is self-evident that the features mentioned above and the features yet to be discussed below may be used not only in the respectively stated combination but also in other combinations or individually without departing from the scope of the disclosure.

BRIEF DESCRIPTION OF THE DRAWINGS

These and other aspects and advantages will become more apparent and more readily appreciated from the following description of the example embodiments which will be described further with reference to various examples and the associated drawing, in which the single drawing is a schematic illustration of an embodiment of the system described herein for the recycling of nitrogen oxides formed in a combustion engine.

DETAILED DESCRIPTION

Reference will now be made in detail to examples which are illustrated in the accompanying drawing.

The single drawing schematically shows an embodiment of the system 10 for the recycling of nitrogen oxides formed in a combustion engine 11.

In the embodiment illustrated, the combustion engine 11 is arranged in a vehicle. The exhaust-gas stream 12 of the combustion engine 11 flows through the exhaust tract of the vehicle. In the exhaust tract, there is arranged an adsorber unit 13, for example an exchangeable cartridge containing an adsorber material, which is designed for the adsorption of nitrogen oxides ($NO_x$) from the exhaust-gas stream 12. During the operation of the combustion engine 11, an adsorption of $NO_x$ occurs in the adsorber unit 13 of the vehicle. During travel, the exhaust-gas stream 12 is conducted through the adsorber unit 13, which contains, for example, adsorber material which can bind $NO_x$ by adsorption. The adsorber unit 13 is thus charged with $NO_x$ and can accommodate up to the accommodation limit of the adsorber unit $NO_x$.

An exchange of the adsorber unit 13 is performed at the latest after the accommodation limit has been reached, that is to say when the adsorber material has been fully saturated with $NO_x$. Either the adsorber unit 13 as a whole is exchanged, or the adsorber material in the adsorber unit 13 of the vehicle is exchanged for new, unladen material. The adsorber unit 13 is therefore, for example, designed as an exchangeable cartridge, or permits a removal of the laden adsorber material and the replacement of the laden material with unladen adsorber material without great installation effort, and for example without the adsorber unit 13 being destroyed in the process.

The material laden with $NO_x$ can be collected and temporarily stored at a collecting point, in order for relatively large quantities of the laden material to be made available for the next operation, and for the recycling process to thereby be made more efficient.

The adsorber unit 13 or the laden adsorber material contained therein is then transferred into a desorption module 14. In the desorption module 14, the nitrogen oxides adsorbed in the adsorber unit 13 are desorbed. In one variant, the adsorber material laden with $NO_x$ is treated either with heat, hot vapor, hot gas or a liquid solvent (for example water). The $NO_x$ changes into the vapor or liquid phase, and the adsorber material remains unchanged. The adsorber material must possibly be dried before being reused. During the desorption and during the drying, moderate temperatures of at most 200° C. should be used. The separated-off $NO_x$ is fed to a reaction unit 15 for further conversion.

In the reaction unit 15, the desorbed nitrogen oxides are converted to form a reaction product 20. For example, in the reaction unit 15 the desorbed nitrogen oxides are converted to form liquid or solid nitrogen-containing compounds 20. For example, the $NO_x$ may be introduced into the production chain of nitric acid, nitrates or non-aqueous, $NO_2$-based solvents.

In one variant, the nitrogen oxides $NO_x$ are firstly converted in the reaction unit 15 to form nitric acid $HNO_3$. The nitric acid is subsequently converted with ammonia $NH_3$ to form ammonium nitrate $NH_4NO_3$, which is used for example as nitrogen fertilizer.

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A system for recycling nitrogen oxides formed in a combustion engine, the system comprising:
   an adsorber unit having an adsorber material including at least one zeolite configured to adsorb nitrogen oxides from an exhaust-gas stream of the combustion engine, the adsorber unit being configured as an exchangeable cartridge or such that adsorber material laden with nitrogen oxides is removable from the adsorber unit so that another adsorber material, unladen with nitrogen oxides, can be accommodated in the adsorber unit, in a non-destructive manner;
   a desorption module, detached from the combustion engine and provided outside of the exhaust-gas stream, configured to desorb, from the adsorber material, nitrogen oxides that have been adsorbed by the adsorber material; and
   a reaction unit, detached from the combustion engine and provided outside of the exhaust-gas stream, configured to convert the nitrogen oxides desorbed by the desorption module into liquid or solid nitrogen-containing compounds.

2. The system according to claim 1, wherein
   the adsorber unit is configured such that adsorber material laden with nitrogen oxides is removable from the adsorber unit, and
   the adsorber unit is configured as a reclosable container from which the adsorber material is removable after opening of the reclosable container.

3. The system according to claim 1, wherein
   the desorption module is configured to heat the adsorber unit, or feed hot water vapor, hot gas or a liquid solvent to the adsorber unit, and thereby desorb nitrogen oxides from the adsorber unit, or
   the desorption module is configured to heat the adsorber material laden with nitrogen oxides, or to treat the adsorber material with hot water vapor, hot gas or a liquid solvent, and thereby desorb nitrogen oxides from the adsorber material.

4. The system according to claim 1, wherein the reaction unit includes a reactor to convert nitrogen oxides to form nitric acid.

5. The system according to claim 4, wherein the reaction unit includes another reactor to convert the nitric acid with ammonia to form ammonium nitrate.

6. A system, for recycling nitrogen oxides formed in a combustion engine, the system comprising:
   an adsorber unit having an adsorber material including at least one zeolite configured to adsorb nitrogen oxides from an exhaust-gas stream of the combustion engine;
   a desorption module, detached from the combustion engine and provided outside of the exhaust-gas stream, configured to desorb, from the adsorber material, nitrogen oxides that have been adsorbed by the adsorber material; and
   a reaction unit, detached from the combustion engine and provided outside of the exhaust-gas stream, configured to convert the nitrogen oxides desorbed by the desorption module into liquid or solid nitrogen-containing compounds, the reaction unit including a reactor to convert nitrogen oxides to form nitric acid.

7. The system according to claim 6, wherein the reaction unit includes another reactor to convert the nitric acid with ammonia to form ammonium nitrate.

8. The system according to claim 6, wherein
the desorption module is configured to heat the adsorber unit, or feed hot water vapor, hot gas or a liquid solvent to the adsorber unit, and thereby desorb nitrogen oxides from the adsorber unit, or
the desorption module is configured to heat the adsorber material laden with nitrogen oxides, or to treat the adsorber material with hot water vapor, hot gas or a liquid solvent, and thereby desorb nitrogen oxides from the adsorber material.

9. A method for the recycling of nitrogen oxides formed in a combustion engine, the method comprising:
adsorbing, in an adsorber unit having an adsorber material including at least one zeolite, nitrogen oxides from an exhaust-gas stream of the combustion engine, the adsorber unit being configured as an exchangeable cartridge or such that adsorber material laden with nitrogen oxides is removable from the adsorber unit so that another adsorber material, unladen with nitrogen oxides, can be accommodated in the adsorber unit, in a non-destructive manner;
removing the adsorber unit having the adsorber material laden with nitrogen oxides or removing the adsorber material laden with nitrogen oxides from the adsorber unit, to a desorption module, the desorption module being detached from the combustion engine and provided outside of the exhaust-gas stream;
desorbing, by the desorption module, the adsorbed nitrogen oxides from the adsorber material; and
converting, by a reaction unit detached from the combustion engine and provided outside of the exhaust-gas stream, the nitrogen oxides desorbed from the adsorber material into liquid or solid nitrogen-containing compounds.

10. The method according to claim 9, wherein the liquid or solid nitrogen-containing compounds include nitrates.

11. The method according to claim 10, wherein the nitrates include ammonium nitrates.

12. The method according to claim 9, wherein the at least one zeolite includes ZSM-5, zeolite Y, or mordenite.

13. The method according to claim 9, wherein
the adsorber unit is configured as the exchangeable cartridge,
the adsorber unit is provided in an exhaust tract of the combustion engine, and
the method comprises:
removing the adsorber unit from the exhaust tract; and
providing another adsorber unit, having an adsorber material unladen with nitrogen oxides, in the exhaust tract of the combustion engine.

14. The method according to claim 9, wherein
the adsorber unit is such that the adsorber material laden with nitrogen oxides is removable from the adsorber unit,
the adsorber material is provided in a container of the adsorber unit, and
the method comprises:
removing the adsorber material laden with nitrogen oxides from the container; and
providing another adsorber material, unladen with nitrogen oxides, in the container.

15. The method according to claim 9, wherein removing the adsorber unit having the adsorber material laden with nitrogen oxides or removing the adsorber material laden with nitrogen oxides from the adsorber unit, is performed in response to reaching a capacity of the adsorber unit for accommodating nitrogen oxides.

16. The method according to claim 9, wherein desorbing the adsorbed nitrogen oxides from the adsorber material includes:
treating the adsorber material with at least one of heat, hot vapor, hot gas, and a liquid solvent, and
separating the nitrogen oxides from the adsorber material.

17. The method according to claim 16, wherein the treating of the adsorber material with the at least one of heat, hot vapor, hot gas, and the liquid solvent, is performed at a temperature of 200° C. or less.

18. The method according to claim 17, further comprising drying the adsorber material at a temperature of 200° C. or less.

19. The method according to claim 9, further comprising after removing the adsorber unit having the adsorber material laden with nitrogen oxides or after removing the adsorber material laden with nitrogen oxides from the adsorber unit, storing the adsorber material laden with nitrogen oxides at a collection point together with a plurality of other adsorber materials laden with nitrogen oxides, and
desorbing the adsorbed nitrogen oxides from the adsorber material includes desorbing the adsorbed nitrogen oxides from the adsorber material together with desorbing the adsorbed nitrogen oxides from the plurality of other adsorber materials.

\* \* \* \* \*